US011598302B2

(12) United States Patent
Puckett et al.

(10) Patent No.: US 11,598,302 B2
(45) Date of Patent: Mar. 7, 2023

(54) FUEL PUMP HEALTH ASSESSMENT SYSTEM

(71) Applicant: Caterpillar Inc., Peoria, IL (US)

(72) Inventors: Daniel R. Puckett, Peoria, IL (US); Bradley S. Bashore, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 85 days.

(21) Appl. No.: 17/102,524

(22) Filed: Nov. 24, 2020

(65) Prior Publication Data

US 2022/0163010 A1   May 26, 2022

(51) Int. Cl.
*G01M 15/09*   (2006.01)
*F02M 65/00*   (2006.01)

(52) U.S. Cl.
CPC .......... *F02M 65/001* (2013.01); *G01M 15/09* (2013.01)

(58) Field of Classification Search
CPC .............................. F02M 65/001; G01M 15/09
See application file for complete search history.

(56) References Cited

U.S. PATENT DOCUMENTS

| | | | | |
|---|---|---|---|---|
| 5,499,538 A * | 3/1996 | Glidewell | ........... | F02D 41/3082 73/114.77 |
| 7,481,102 B2 * | 1/2009 | Bickley | ................... | F02C 9/263 73/114.41 |
| 8,991,363 B2 | 3/2015 | Steffen et al. | | |
| 9,790,869 B2 | 10/2017 | Flynn et al. | | |
| 2014/0121949 A1 * | 5/2014 | Song | ................... | F02D 41/3854 701/104 |
| 2014/0222312 A1 * | 8/2014 | Radeczky | ............ | F02M 65/006 701/102 |
| 2016/0153381 A1 * | 6/2016 | Kim | ...................... | F02D 41/222 701/115 |
| 2018/0216566 A1 * | 8/2018 | Taxon | ................... | F02D 41/407 |
| 2019/0040812 A1 | 2/2019 | Sarwar et al. | | |
| 2021/0180536 A1 * | 6/2021 | Girard | .................... | F02M 65/00 |

FOREIGN PATENT DOCUMENTS

| | | |
|---|---|---|
| EP | 2653706 A1 | 10/2013 |
| JP | 2007132266 A | 5/2007 |
| JP | 4239958 B2 | 1/2009 |

* cited by examiner

*Primary Examiner* — Eric S. McCall
(74) *Attorney, Agent, or Firm* — Bookoff McAndrews, PLLC

(57) ABSTRACT

A pump health assessment system and a method for providing a pump health of a pump is disclosed. The method includes: determining that there is an imbalance in the pump; increasing pump flow from the pump; measuring a rail pressure of a fuel rail; determining if the rail pressure is substantially equal to an expected rail pressure profile; and in accordance with a determination that the rail pressure is not substantially equal to the rail pressure profile, outputting an indication of pump damage.

17 Claims, 3 Drawing Sheets

FUEL PUMP HEALTH ASSESSMENT SYSTEM

TECHNICAL FIELD

The present disclosure relates generally to high pressure pumps, and more particularly, to a pump health assessment system for such pumps.

BACKGROUND

Fuel pumps for internal combustion engines, such as high pressure common rail pumps, may fail due to cavitation damage in the pump. The severity and accumulation rates of cavitation damage may vary based on pump operating conditions. Pumps may fail due to cavitation damage with little advance warning, which may lead to significant and unplanned engine downtime. Diagnosing the health of the pump may require purging air from the pump (e.g., priming the pump). Further, a false diagnosis of pump failure or pump damage may occur due to air in the fuel not being purged entirely when the pump is operated at low pump flows.

U.S. Patent Application Publication No. 2019/0040812, published on Feb. 7, 2019 ("the '812 publication"), describes a method of diagnosing a high pressure fuel delivery system. The method includes sensing a cranking fuel pressure in the fuel rail while the engine is cranking and not firing to build or increase the fuel pressure within the fuel rail. The method determines a cranking leak rate based on the cranking fuel pressure. The method may identify a leak or inefficiency in the high pressure fuel pump when the cranking leak rate is greater than a cranking leak threshold. However, the method of the '812 publication may not adequately determine pump health and/or may falsely diagnose the leak or inefficiency of the pump.

The pump health assessment system of the present disclosure may solve one or more of the problems set forth above and/or other problems in the art. The scope of the current disclosure, however, is defined by the attached claims, and not by the ability to solve any specific problem.

SUMMARY

In one aspect, a method for providing a pump health of a pump is disclosed. The method includes: determining that there is an imbalance in the pump; increasing pump flow from the pump; measuring a rail pressure of a fuel rail; determining if the rail pressure is substantially equal to an expected rail pressure profile; and in accordance with a determination that the rail pressure is not substantially equal to the rail pressure profile, outputting an indication of pump damage.

In another aspect, a pump health assessment system is disclosed. The system includes: a pump; a liquid fuel rail; a sensor for measuring a rail pressure of the liquid fuel rail; and a controller configured to: determine that there is an imbalance in the pump; increase pump flow from the pump; measure the rail pressure of the liquid fuel rail; determine if the rail pressure is substantially equal to an expected rail pressure profile; and in accordance with a determination that the rail pressure is not substantially equal to the rail pressure profile, output an indication of pump damage.

In yet another aspect, a method for providing a pump health of a pump is disclosed. The method includes: determining that there is an imbalance in the pump; increasing pump flow from the pump; measuring a rail pressure of a fuel rail; determining if the rail pressure increases at an expected increase rate; in accordance with a determination that the rail pressure does not increase at the expected increase rate, outputting an indication of pump damage; in accordance with a determination that the rail pressure increases at the expected increase rate, outputting an indication that pump health is normal based on air purge; measuring a pump flow rate of the pump; determining whether the pump flow rate is substantially equal to an expected pump flow rate; in accordance with a determination that the pump flow rate is substantially equal to the expected pump flow rate, outputting an indication that pump health is normal; and in accordance with a determination that the pump flow rate is not substantially equal to the expected pump flow rate, outputting an indication of pump damage.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
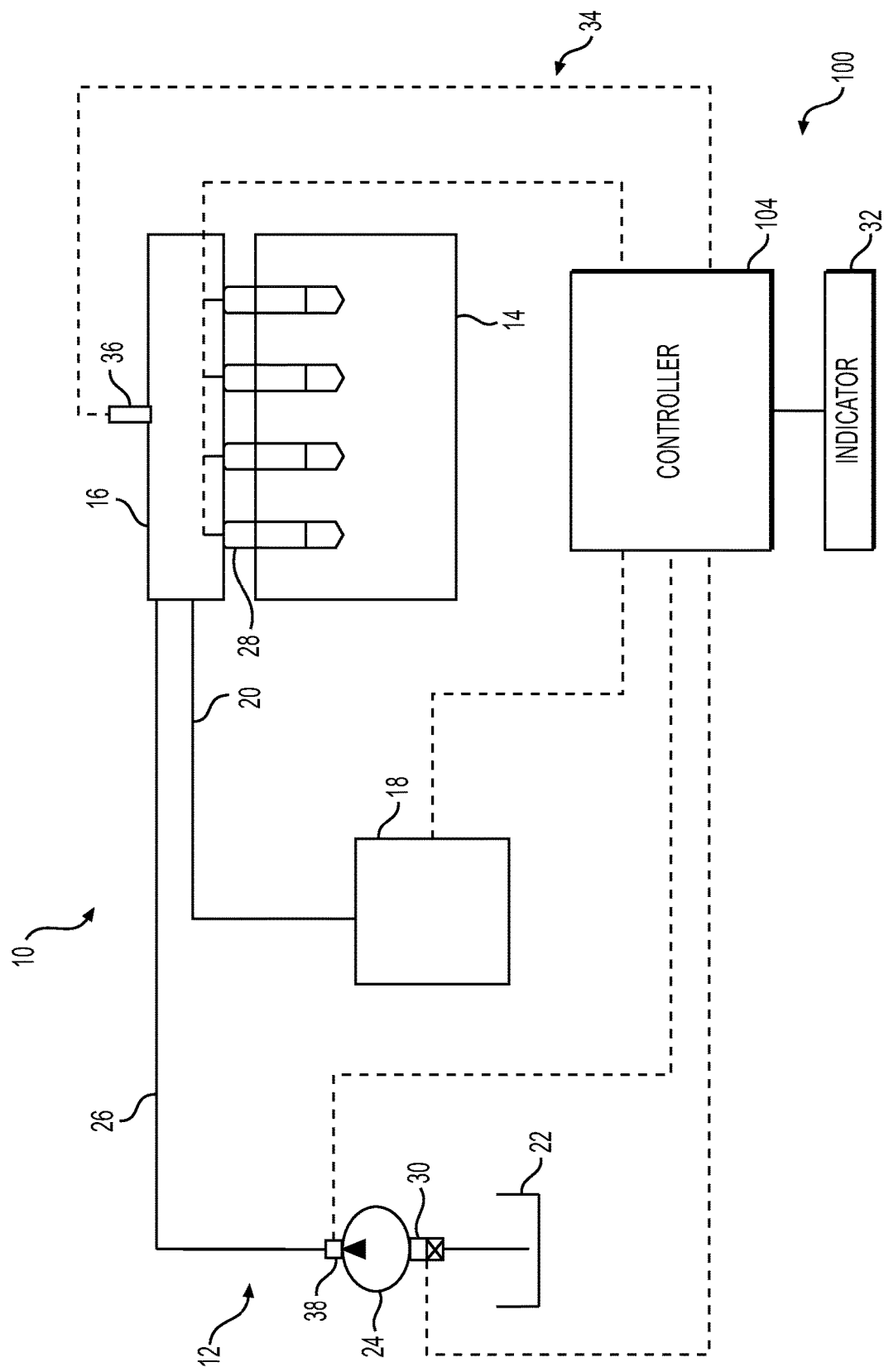
FIG. 1 is a schematic view of an engine system having a pump health assessment system, according to aspects of the disclosure.

FIG. 1 illustrates a schematic view of an engine system 10 system having a pump health assessment system 100. Engine system 10 may be an internal combustion engine capable of operating on two fuels, referred to as a dual fuel engine. For example, engine system 10 may employ liquid fuel and/or gaseous fuel, or a combination of both liquid fuel and gaseous fuel. While diesel fuel is used in the exemplary embodiment, it is understood that any type of liquid fuel may be used, such as gasoline, methanol, ethanol, or any other type of liquid fuel. Further, as used herein, "gaseous fuel" may include fuel that is supplied to engine system 10 in gaseous form. Gaseous fuel may include, for example, natural gas, propane, bio-gas, landfill gas, carbon monoxide, hydrogen, or mixtures thereof. It is understood that engine system 10 may employ only a single fuel at one time (liquid or gaseous fuel), or may employ both the liquid fuel and the gaseous fuel in unison. While the exemplary embodiment includes a dual fuel engine system, it is understood that the pump health assessment system 100 described herein may be used with a single fuel engine system (e.g., employing liquid fuel only).

As shown in FIG. 1, engine system 10 includes a liquid fuel delivery system 12, an engine 14, a liquid fuel common rail 16, a pump health assessment system 100, and an output indicator 32. Engine 16 may be an internal combustion engine and may include one or more cylinders (not shown) and a crankshaft (not shown) for providing power to a flywheel (not shown) or the like. Engine system 10 may also include a gaseous fuel delivery system 18 for delivering gaseous fuel to the cylinders of engine 16, as described above. For example, gaseous fuel delivery system 18 may include a gaseous fuel supply (not shown), such as a gas tank, and a gaseous fuel supply line 20 for supplying gaseous fuel from the gaseous fuel supply to the cylinders of engine 14. Accordingly, gaseous fuel may flow from the gaseous fuel supply through gaseous fuel supply line 20 and into the cylinders. It is understood that gaseous fuel delivery system 18 may include any number and/or combination of components, such as, for example, filters, valves, a gaseous fuel rail, or any other component of a gaseous fuel delivery system known in the art.

Liquid fuel delivery system 12 may include a liquid fuel supply 22, such as a fuel tank, a pump 24, and the liquid fuel common rail 16 in communication with each other via a liquid fuel supply line 26. Common rail 16 may be fluidly coupled to one or more fuel injectors 28 for injecting liquid fuel into the cylinders of engine 14. Pump 24 may be a high pressure pump for providing fuel from supply 22 to common rail 16 at a high pressure. High pressure pump 24 may include a mechanical pump for compressing and pressurizing fluid (e.g., fuel) to high pressures. Pump 24 may include a valve 30, such as an inlet metering valve, for ensuring that only a quantity of fuel required by injectors 28 is provided to common rail 16. Valve 30 may be any type of valve, such as a solenoid valve, proportional spool valve, or the like. Accordingly, valve 30 may be controllable to various positions between an open position and a closed position for adjusting a fuel flow rate and metering the quantity of fuel to pump 24, and thus to rail 16 for distribution of the fuel to injectors 28. Liquid fuel system 12 may also include a filter and a low pressure pump (not shown), such as a fuel transfer pump, between the liquid fuel supply 22 and pump 24 for generating a flow of fuel from supply 22 to pump 24. It is understood that liquid fuel delivery system 12 may include any number and/or combination of valves or other components known in the art.

Output indicator 32 may indicate pump health of the pump 24. Output indicator 32 may include a display, a gauge, a light, a speaker, or the like. For example, output indicator 32 may indicate a value (numerical value, percentage, or the like) of pump health of pump 24 and/or may indicate (e.g., via a notification) when pump health of pump 24 decreases below a predetermined threshold. Indicator 32 may be located in an operator cab (not shown) and/or may be located remote from engine system 10. While only a single output indicator 32 is described herein, it is understood that output indicator 32 may include one or more indicators and may include any type of indicator for indicating pump health of pump 24.

Pump health assessment system 100 includes a controller 104, such as an engine control module (ECM), and a sensor system 34 connected to controller 104. Sensor system 34 may include one or more sensors for measuring pump operating conditions, such as pressure sensors, flow sensors, speed sensors, or the like. For example, sensory system 34 may include a rail pressure sensor 36 and a pump flow sensor 38. Rail pressure sensor 36 may be located in common rail 16 and may sense a rail pressure. Pump flow sensor 38 may be located in liquid fuel supply line 26 at an outlet of pump 24 and may sense a flow rate of liquid fuel from pump 24. For example, pump flow sensor 38 may include a flowmeter that measures the amount of liquid fuel that passes through the flowmeter during a time period to determine the flow rate of the liquid fuel in liquid fuel supply line 26. Pump flow sensor 38 may be located anywhere along liquid fuel supply line 26. It is understood that sensor 36 may include any type of sensor such as resistive sensors, inductive sensors, capacitive sensors, piezoelectric sensors, optical sensors, micro electro-mechanical system sensors, or the like. Further, it is understood that sensor 38 may include any type of sensor for measuring or sensing flow of liquid fuel such as obstruction type flowmeters, inferential flowmeters, electromagnetic sensors, positive-displacement sensors, fluid dynamic sensors, mass flowmeters, or the like. Further, sensor system 34 may include any number and/or combination of sensors as necessary. Controller 104 may also be in communication with valve 30 for controlling a position of valve 30 and with injectors 28 for regulating and controlling fuel injection into the cylinders of engine 14. Controller 104 may also be in communication with components of gaseous fuel supply system 18 for controlling aspects of gaseous fuel supply system 18.

Figure 2:
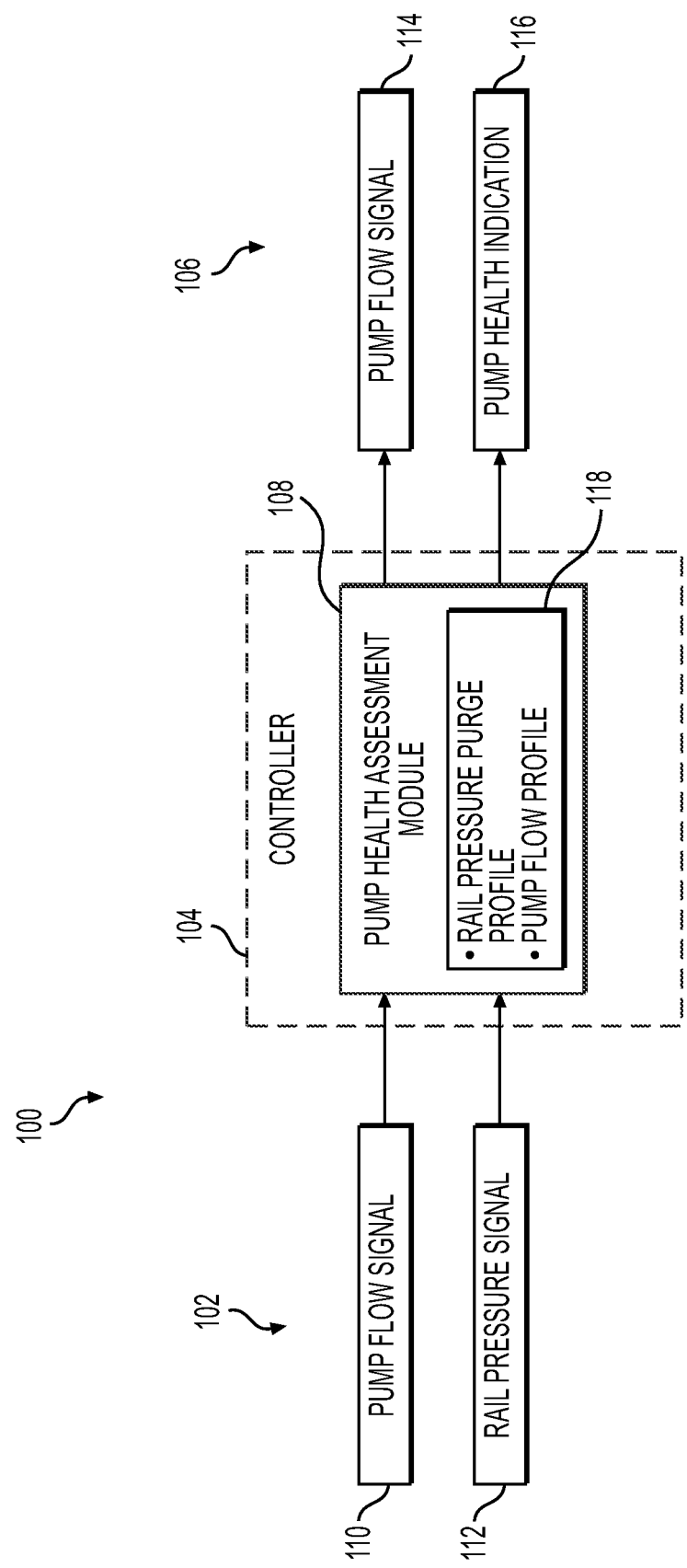
FIG. 2 is a schematic view of the exemplary pump health assessment system for the engine system of FIG. 1.

FIG. 2 illustrates a schematic view of the exemplary pump health assessment system 100 for operation and/or control of at least portions of engine system 10. System 100 may include inputs 102, controller 104, and outputs 106. Inputs 102 may include, for example, pump flow signal 110 from flow sensor 38 and rail pressure signal 112 from pressure sensor 36. Controller 104 may also derive pump flow signal 110 based on a position of valve 30. For example, a value indicative of pump flow may be proportional to the position of valve 30. Thus, in some embodiments, flow sensor 30 may not be needed, or may be used in addition to deriving pump flow signal 110 via valve 30. Outputs 106 may include, for example, a pump flow signal 114 and a pump health indication signal 116. Controller 104 also includes a pump health assessment module 108. Pump health assessment module 108 may receive inputs 102, implement a method for providing a pump health and control outputs 106, as described with reference to FIG. 3 below.

Controller 104 may embody a single microprocessor or multiple microprocessors that may include means for providing a pump health of pump 24 for engine system 10. For example, controller 104 may include a memory, a secondary storage device, and a processor, such as a central processing unit or any other means for accomplishing a task consistent with the present disclosure. The memory or secondary storage device associated with controller 104 may store data and/or software routines that may assist controller 104 in performing its functions, such as the functions of method of FIG. 3. Further, the memory or secondary storage device associated with controller 104 may also store data received from the various inputs 102 associated with pump health assessment system 100. Numerous commercially available microprocessors can be configured to perform the functions of controller 104. It should be appreciated that controller 104 could readily embody a general machine controller capable of controlling numerous other machine functions. Various other known circuits may be associated with controller 104, including signal-conditioning circuitry, communication circuitry, hydraulic or other actuation circuitry, and other appropriate circuitry.

Controller 104 may also include stored values for use by module 108. For example, the stored values may include a rail pressure purge profile and a pump flow profile 118. Rail pressure may be dependent on pump health of pump 24 such that rail pressure may be indicative of pump health, as detailed further below. For example, if cavitation exists in pump 24 and/or pump 24 is otherwise failing, rail pressure in rail 16 may be lower than an expected rail pressure. Similarly, if pump health of pump 24 is normal (e.g., no cavitation and/or pump 24 is not failing), rail pressure in rail 16 may be substantially equal to or at the expected rail pressure. Thus, the rail pressure purge profile may provide a predetermined, or expected, profile of rail pressure for various flow rates from pump 24. For example, the rail pressure purge profile may include rail pressure thresholds, rail pressure increase and/or decrease rate thresholds, or any other values or thresholds of rail pressure that indicate a pump health of pump 24. Further, flow rate from pump 24 may be dependent on pump health of pump 24 such that the flow rate may be indicative of pump health, as detailed further below. For example, if cavitation exists in pump 24 and/or pump 24 is otherwise failing, the flow rate from pump 24 may be lower than an expected flow rate. Similarly, if pump health of pump 24 is normal (e.g., no cavitation and/or pump is not failing), flow rate from pump 24 may be substantially equal to or at the expected flow rate. As described above, the flow rate from pump 24 may be dependent on the position of valve 30. Thus, pump flow profile may provide a predetermined, or expected, pump flow for pump 24 for various positions of valve 30. For example, the flow rate profile may provide flow rate thresholds, flow rate increase and/or decrease thresholds, or any other values or thresholds of flow rate that indicate a pump health of pump 24. It is understood that the rail pressure purge profile and/or the pump flow profile may include various look up tables and/or maps for determining the expected rail pressure and/or expected flow rate, described above.

Pump flow signal 114 output may include control of aspects of engine system 10. For example, pump flow signal 114 may include controller 104 outputting, or otherwise sending, a signal to valve 30 for controlling a position of valve 30 to achieve a desired fuel flow rate from pump 24, as described above. The pump flow signal 114 may be dependent on rail pressure signal 16 and/or signals from fuel injectors 28. For example, controller 104 may control the pump flow rate from pump 24 (via pump flow signal 114) to control an amount of liquid fuel supplied to rail 16 for distribution of the fuel to injectors 28. Thus, controller 104 may ensure adequate fuel delivery to the cylinders of engine 14. Pump health indication signal 116 may include control of aspects of engine system 10. For example, pump health indication signal 116 may include controller 104 outputting a signal to display a value indicative of pump health on output indicator 32 (e.g., on a display). Pump health indication signal 116 may also include controller 104 outputting an alert, such as a light, an audible alert, an alert on a display, or the like when pump health decreases below a threshold.

INDUSTRIAL APPLICABILITY

The disclosed aspects of the pump health assessment system 100 of the present disclosure may be used in any engine system 10 having pump 24 that may be subject to cavitation damage or other failures. As used herein, "pump failure," "pump health failure," and "failure" may be used interchangeably and may include any type of impending failure of pump, excessive pump wear, pump damage, and/or any other type of failure, wear, or damage of pump 24 and/or of components of pump 24.

Referring to FIG. 1, during the operation of engine system 10, pump 24 may draw fuel from liquid fuel supply 22 through valve 30. Pump 24 may thus provide pressurized liquid fuel out of pump 24 to rail 16. The pressurized liquid fuel may then be injected through injectors 28 into the cylinders of engine 14, and combustion of the liquid fuel (and air) in the cylinders may cause rotation of the crankshaft to provide useful mechanical power. When engine system 10 includes a dual fuel engine, gaseous fuel may also be delivered to the cylinders of engine 14, as detailed above. In some instances, cavitation may occur in pump 24 that may cause damage to components of pump 24. For example, under certain operating conditions, vapor pressure of the liquid fuel may drop below a threshold and air bubbles may form in the liquid fuel. When the fuel is pressurized, the air bubbles may implode causing damage to components of pump 24. Cavitation damage may reduce the pump health of pump 24, and thus pump 24 may fail. Pump 24 may also fail, or otherwise be damaged, due to other reasons, such as, for example, debris from pump 24 damaging the injectors 28, or rotational component (e.g., bearings) failures due to oil-side debris of pump 24. Further, when the engine system 10 is a dual fuel engine system, as described above, and the engine system 10 is employing both liquid fuel and gaseous fuel, pump 24 may run at low pump flow to utilize less liquid fuel and reduce liquid fuel cost. However, a false diagnosis may occur when any air in the liquid fuel has not been entirely purged from pump 24. For example, when the pump 24 is operating at low pump flow conditions, air in pump 24 may not be entirely purged. Further, passively purging the air in pump 24 only during start-up of engine system 10 and low liquid fuel pressure may require engine system 10 to run in a liquid fuel only mode for an extended period of time, and fuel costs may correspondingly increase. Thus, as detailed below with reference to FIG. 3, pump health assessment system 100 may proactively increase the pump flow to properly purge the air from pump 24 prior to diagnosing the pump health of pump 24.

Figure 3:
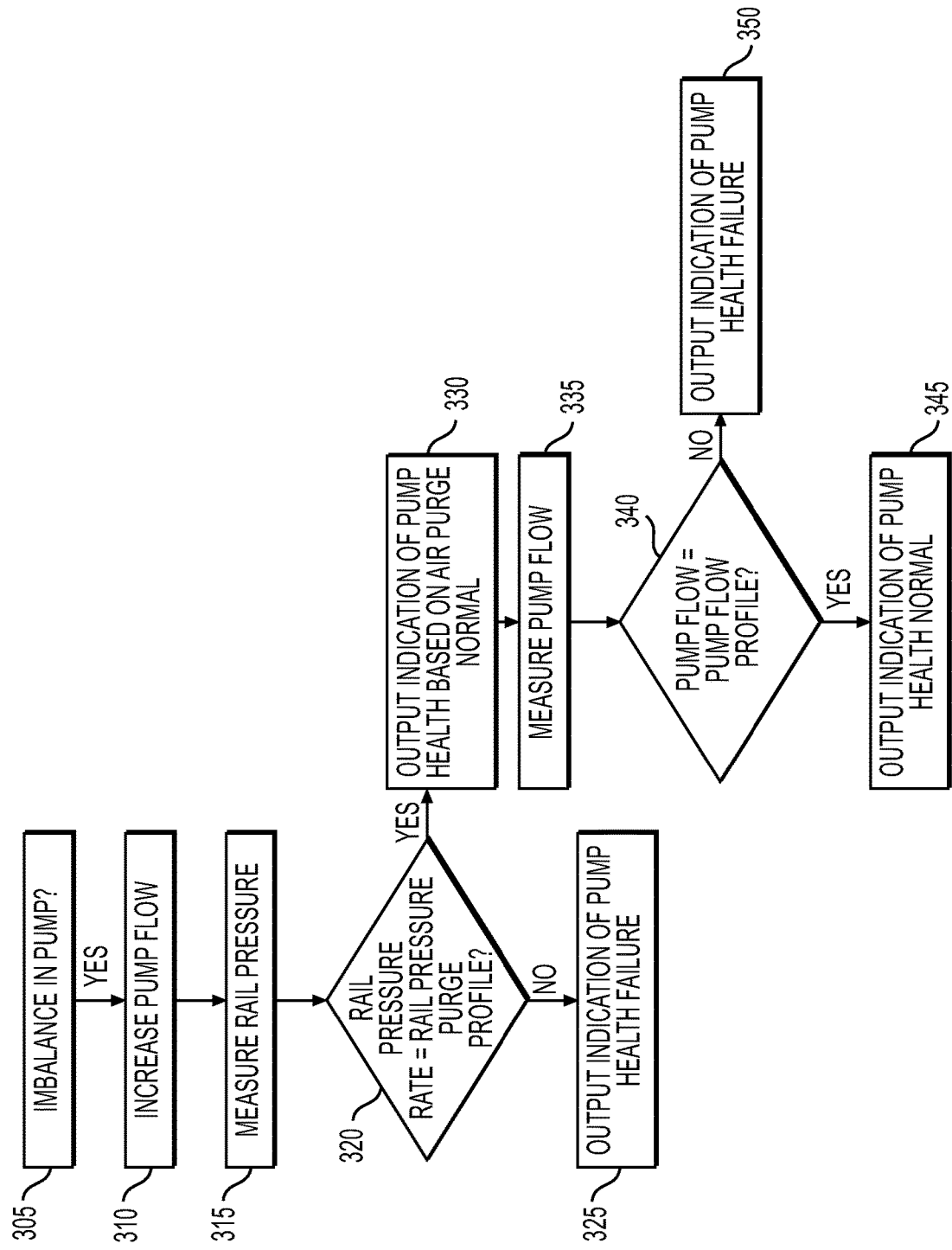
FIG. 3 provides a flowchart depicting an exemplary method for providing a pump health assessment for the system of FIG. 1.

FIG. 3 illustrates a flowchart depicting an exemplary method 300 for providing a pump health of pump 24 for engine system 10. In step 305, module 108 may determine that there is an imbalance in pump 24. For example, components of pump 24 may become imbalanced due to cavitation damage and/or other damage. Imbalance in pump 24 may also occur due to air being entrapped within the liquid fuel. Thus, an imbalance in pump 24 may indicate that the pump 24 is damaged (e.g., or otherwise failing) or may need to be primed to purge the air from the pump 24. When an imbalance occurs in pump 24, pump flow from pump 24 may be different than (e.g., not substantially equal to) a pump flow profile. For example, the pump flow profile may include an expected pump flow rate for various positions of valve 30, as detailed above. Thus, to determine an imbalance, module 108 may measure the pump flow rate from the pump 24 (via pump flow signal 110), and determine whether the pump flow rate is substantially equal to an expected pump flow rate. In accordance with a determination that the pump flow rate is not substantially equal to the expected pump flow rate, module 108 may determine that there is an imbalance in pump 24. Further, when an imbalance occurs in pump 24, rail pressure in rail 16 may be different (e.g., not substantially equal to) than a rail pressure purge profile. For example, the rail pressure purge profile may include an expected rail pressure for various pump flow conditions, as detailed above. Thus, to determine an imbalance, module 108 may measure the rail pressure of rail 16 (via rail pressure signal 112), and determine whether the rail pressure is substantially equal to an expected rail pressure. In accordance with a determination that the rail pressure is not substantially equal to the expected rail pressure, module 108 may determine that there is an imbalance in pump 24. Further, module 108 may determine that an imbalance does not exist in pump 24 when the pump flow rate is substantially equal to the expected and/or the rail pressure is substantially equal to the expected rail pressure. It is understood that module 108 may determine an imbalance in pump 24 by any other method known in the art.

In step 310, when module 108 has determined that there is an imbalance in pump 24 (Step 305: YES), module 108 may increase pump flow from the pump 24. For example, controller 104 may send pump flow signal 114 to valve 30 to control a position of valve 30 such that pump flow from the pump 24 is increased. Increasing pump flow to a relatively high pump flow helps to ensure that any air in the pump 24 is entirely purged from the pump 24.

In step 315, module 108 may measure rail pressure of rail 16. For example, controller 104 may receive the rail pressure signal 110 and determine, or otherwise derive, the rail pressure of rail 16. Module 108 may also determine a rate of rail pressure change over time based on the rail pressure signal 110.

In step 320, module 108 may determine whether the rail pressure of rail 16 is substantially equal to the rail pressure purge profile. For example, the rail pressure of rail 16 may be dependent on the pump flow from pump 24. Module 108 may compare the rail pressure of rail 16 to the rail pressure purge profile. For example, when the health of pump 24 is normal, and the pump flow from pump 24 is increased, the rail pressure of rail 16 correspondingly increases to an expected rail pressure and/or at an expected rail pressure rate based on the rail pressure purge profile. When there is a pump health failure in pump 24 (e.g., the pump 24 is damaged), the rail pressure of rail 16 may not correspondingly increase to the expected rail pressure and/or at the expected rail pressure rate based on the rail pressure purge profile.

In step 325, in accordance with a determination that the rail pressure of rail 16 is not substantially equal to the rail pressure purge profile (Step 320: NO), module 108 may output an indication of pump health failure of pump 24 (e.g., an indication that there is pump damage). For example, module 108 may display the pump health on output indicator 32 (e.g., on a display and/or as a notification, such as a light, an audible alert, an alert on a display, etc.). When the rail pressure rate increase does not substantially equal the expected rail pressure rate increase based on the rail pressure purge profile, module 108 may determine that air remains in the pump 24 and that there is a pump health failure (e.g., pump damage).

In step 330, in accordance with a determination that the rail pressure of rail 16 is substantially equal to the rail pressure purge profile (Step 320: YES), module 108 may output an indication of pump health of pump 24 is normal based on air purge. For example, module 108 may display the health on output indicator 32, as described above. When the rail pressure increase rate is equal to the expected rail pressure increase rate based on the rail pressure purge profile, module 108 may determine that the air has been purged from pump 24 and pump health due to air purge is normal.

After it is determined that the air has been purged from pump 24, module 108 may perform a pump health diagnosis to determine pump health of pump 24 based on other factors. Thus, module 108 may measure pump flow from pump 24. For example, module 108 may receive pump flow signal 112, as described above, and determine, or otherwise derive, the pump flow rate from pump 24. In some embodiments, module 108 may perform step 335 after an indication of pump health failure of pump 24 based on air purge as well.

In step 340, module 108 may determine whether the pump flow is substantially equal to the pump flow profile. For example, module 108 may compare the pump flow to the pump flow profile. When the pump health of pump 24 is normal, the air has been purged from pump 24, and the pump flow from pump 24 has been increased, the pump flow from pump 24 correspondingly increases to an expected pump flow and/or at an expected pump flow rate based on the pump flow profile. However, when there is a pump health failure in pump 24 (e.g., pump 24 is damaged), the pump flow from pump 24 will not correspondingly increase to the expected pump flow and/or at the expected pump flow rate based on the pump flow profile even after the air has been purged from pump 24.

In step 345, in accordance with a determination that the pump flow is substantially equal to the pump flow profile (Step 340: YES), module 108 may output an indication that pump health of pump 24 is normal. For example, module 108 may display the pump health on output indicator 32, as described above.

In step 350, in accordance with a determination that the pump flow is not substantially equal to the pump flow profile (Step 340: NO), module 108 may output an indication of pump health failure of pump 24 (e.g., an indication of pump damage). For example, module 108 may display the pump health on output indicator 32, as described above.

In some embodiments, module 108 may decrease pump flow from pump 108 to zero after increasing the pump flow. Module 108 may alternate between increasing the pump flow to a high flow and decreasing the pump flow to zero. During periods of zero pump flow, module 108 may determine whether the rail pressure decrease rate is substantially equal to an expected rail pressure decrease rate, as similarly described above. Module 108 may also command periods of normal pump flow (e.g., between zero and high pump flow) between periods of high pump flow and periods of zero pump flow. Doing so may help prevent oscillation of speed and load on engine system 10 and/or to reduce noise, vibration, and harshness on engine system 10. Thus, for each sequence of increased pump flow, normal pump flow, and zero pump flow, module 108 may evaluate rail pressure of rail 16, as detailed above. Module 108 may then determine that air purge from pump 24 is completed when the pump flow from pump 24 has been stabilized. When the pump flow is stabilized, module 108 may perform the pump health diagnosis as described above with respect to steps 330-350.

Pump health assessment system 100 may provide a pump health indication of pump 24. For example, pump health assessment system 100 may detect pump health failures due to cavitation damage in pump 24 and/or due to other causes. Further, pump health assessment system 100 may eliminate or reduce the need to force diesel only mode in dual fuel engine systems to purge air from the pump 24 when the engine system 14 starts up or when there is low fuel pressure, thus saving liquid fuel. Pump health assessment system 100 may also reduce the risk of false pump health failure detection based on air in the pump 24. Accordingly, pump health assessment system 100 may more accurately determine pump health of pump 24 and proactively alert a user (e.g., operator, technician, etc.) so that the user may repair and/or replace pump 24.

It will be apparent to those skilled in the art that various modifications and variations can be made to the disclosed system without departing from the scope of the disclosure. For example, the pump health assessment system 100 may include additional factors or variables for triggering the increase in pump flow to perform the pump health assessment. For example, module 108 may increase the pump flow to purge the air from pump 24 after start-up of engine system 10, during low fuel pressure events, and when there is an extended period of operation of engine system 10 with pump health unknown. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for providing a pump health of a pump, comprising:
   determining that there is an imbalance in the pump;
   increasing pump flow from the pump;
   alternating between increasing the pump flow to a high pump flow and subsequently decreasing the pump flow to zero;
   measuring a rail pressure of a fuel rail during a period of zero pump flow;
   determining if the rail pressure is substantially equal to an expected rail pressure profile; and
   in accordance with a determination that the rail pressure is not substantially equal to the rail pressure profile, outputting an indication of pump damage.

2. The method of claim 1, wherein determining that there is an imbalance in the pump includes:
   measuring a pump flow rate from the pump;
   determining whether the pump flow rate is substantially equal to an expected pump flow rate; and
   in accordance with a determination that the pump flow rate is not substantially equal to the expected pump flow rate, determining that there is an imbalance in the pump.

3. The method of claim 1, wherein the rail pressure profile includes expected rail pressure increase rates for various rates of increased pump flow.

4. The method of claim 1, wherein the rail pressure profile includes expected rail pressure decrease rates for various rates of decreased pump flow.

5. The method of claim 1, further including:
   in accordance with a determination that the rail pressure is substantially equal to the rail pressure profile, outputting an indication that pump health is normal based on air purge.

6. The method of claim 5, wherein after outputting the indication that pump health is normal based on air purge, the method further includes:
   measuring a pump flow rate of the pump;
   determining whether the pump flow rate is substantially equal to a pump flow profile; and
   in accordance with a determination that the pump flow rate is substantially equal to the pump flow profile, outputting an indication that pump health is normal.

7. The method of claim 6, further including:
   in accordance with a determination that the pump flow rate is not substantially equal to the pump flow profile, outputting an indication of pump damage.

8. A pump health assessment system, comprising:
   a pump;
   a liquid fuel rail;
   a sensor for measuring a rail pressure of the liquid fuel rail; and
   a controller configured to:
      determine that there is an imbalance in the pump;
      increase pump flow from the pump;
      measure the rail pressure of the liquid fuel rail;
      determine if the rail pressure is substantially equal to an expected rail pressure profile;
      in accordance with a determination that the rail pressure is not substantially equal to the rail pressure profile, output an indication of pump damage; and
      in accordance with a determination that the rail pressure is substantially equal to the rail pressure profile, output an indication that pump health is normal based on air purge.

9. The system of claim 8, wherein determining that there is an imbalance in the pump includes the controller configured to:
   measure a pump flow rate from the pump;
   determine whether the pump flow rate is substantially equal to an expected pump flow rate; and
   in accordance with a determination that the pump flow rate is not substantially equal to the expected pump flow rate, determine that there is an imbalance in the pump.

10. The system of claim 8, wherein the rail pressure profile includes expected rail pressure increase rates for various rates of increased pump flow.

11. The system of claim 8, wherein after outputting the indication that pump health is normal based on air purge, the controller is further configured to:
    measure a pump flow rate of the pump;
    determine whether the pump flow rate is substantially equal to a pump flow profile; and
    in accordance with a determination that the pump flow rate is substantially equal to the pump flow profile, output an indication that pump health is normal.

12. The system of claim 11, wherein the controller is further configured to:
    in accordance with a determination that the pump flow rate is not substantially equal to the pump flow profile, output an indication of pump damage.

13. The system of claim 8, wherein the controller is further configured to:
    decrease pump flow from the pump to zero after increasing the pump flow.

14. The system of claim 13, wherein the controller is further configured to:
    alternate between increasing the pump flow to a high pump flow and decreasing the pump flow to zero.

15. The system of claim 14, wherein the rail pressure profile includes expected rail pressure decrease rates for various rates of decreased pump flow.

16. A method for providing a pump health of a pump, comprising:
    determining that there is an imbalance in the pump;
    increasing pump flow from the pump;
    measuring a rail pressure of a fuel rail;
    determining if the rail pressure increases at an expected increase rate;

in accordance with a determination that the rail pressure does not increase at the expected increase rate, outputting an indication of pump damage;

in accordance with a determination that the rail pressure increases at the expected increase rate, outputting an indication that pump health is normal based on air purge;

measuring a pump flow rate of the pump;

determining whether the pump flow rate is substantially equal to an expected pump flow rate;

in accordance with a determination that the pump flow rate is substantially equal to the expected pump flow rate, outputting an indication that pump health is normal; and in accordance with a determination that the pump flow rate is not substantially equal to the expected pump flow rate, outputting an indication of pump damage.

17. The method of claim 16, further comprising:

decreasing pump flow from the pump to zero after increasing the pump flow; and alternating between increasing the pump flow to a high pump flow and decreasing the pump flow to zero.

\* \* \* \* \*